(12) United States Patent
Morin et al.

(10) Patent No.: US 8,528,177 B2
(45) Date of Patent: Sep. 10, 2013

(54) MANDREL EXTRACTION TOOL AND METHOD OF USING SAME

(75) Inventors: Paul C. Morin, Keller, TX (US); Michael Greene, Canyon, TX (US)

(73) Assignee: Bell Helicopter Textron Inc., Fort Woth, TX (US)

(*) Notice: Subject to any disclaimer, the term of this patent is extended or adjusted under 35 U.S.C. 154(b) by 1531 days.

(21) Appl. No.: 12/091,426

(22) PCT Filed: Nov. 2, 2005

(86) PCT No.: PCT/US2005/039706
§ 371 (c)(1),
(2), (4) Date: Apr. 24, 2008

(87) PCT Pub. No.: WO2007/053144
PCT Pub. Date: May 10, 2007

(65) Prior Publication Data
US 2009/0255105 A1    Oct. 15, 2009

(51) Int. Cl.
*B25B 27/14*    (2006.01)
(52) U.S. Cl.
USPC .................................. 29/271; 29/278; 29/256
(58) Field of Classification Search
USPC ........... 29/271, 256, 278, 250, 251; 269/218; 81/302, 355, 315, 373
See application file for complete search history.

(56) References Cited

U.S. PATENT DOCUMENTS

| | | | |
|---|---|---|---|
| 2,580,223 A | 12/1951 | Gonda | |
| 3,121,941 A | 2/1964 | Bellarts | |
| 3,290,971 A | 12/1966 | Belval | |
| 3,813,750 A * | 6/1974 | Kerr | 29/229 |
| 3,990,137 A * | 11/1976 | Kulba et al. | 29/229 |
| 6,000,686 A | 12/1999 | Yates | |

FOREIGN PATENT DOCUMENTS
WO    96/07524 A1    9/2010

OTHER PUBLICATIONS

First Office Action in CN counterpart Application No. 2005800519949, issued by Patent Office of China, Feb. 27, 2009.
Second Office Action in CN counterpart Application No. 2005800519949, issued by Patent Office of China, Aug. 14, 2009.
Third Office Action in CN counterpart Application No. 2005800519949, issued by Patent Office of China, Dec. 4, 2009.
Search Report in Canadian counterpart Application No. 2,627,246, issued by Canadian Intellectual Property Office, Apr. 15, 2011, 2 pages.
International Preliminary Report on Patentability from Parent PCT Application PCT/US05/39706, issued by the International Preliminary Examining Authority, Dec. 9, 2008, 5 pages.

(Continued)

*Primary Examiner* — Lee D Wilson
*Assistant Examiner* — Jamal Daniel
(74) *Attorney, Agent, or Firm* — James E. Walton; J. Oliver Williams (57) ABSTRACT

A mandrel extraction tool includes an actuator assembly and a first mandrel interface arm operably associated with the actuator assembly and adapted to engage a first mandrel. The mandrel extraction tool further includes a second mandrel interface arm operably associated with the actuator assembly and adapted to engage a second mandrel, the second mandrel interface arm being slidingly coupled with the first mandrel interface arm, such that the first mandrel interface arm moves generally linearly with respect to second interface arm when the actuator assembly is actuated. A method for extracting a mandrel includes providing a mandrel extraction tool, engaging the mandrel extraction tool with a mandrel, and applying a force to the mandrel to linearly extract the mandrel from a first portion of a structure.

14 Claims, 9 Drawing Sheets

(56) References Cited

OTHER PUBLICATIONS

International Search Report and Written Opinion from Parent PCT Application PCT/US05/39706, issued by the International Search Authority, Sep. 20, 2008, 7 pages.

Search Report in EP counterpart Application No. 05856928.6, issued by European Patent Office, Aug. 19, 2010.
Fourth Office Action in CN counterpart Application No. 2005800519949, issued by Patent Office of China, Feb. 10, 2010.

* cited by examiner

MANDREL EXTRACTION TOOL AND METHOD OF USING SAME

BACKGROUND

1. Field of the Invention

The present invention relates to composites manufacturing. In particular, the present invention relates to a mandrel extraction tool and a method of using same.

2. Description of Related Art

Figure 1:
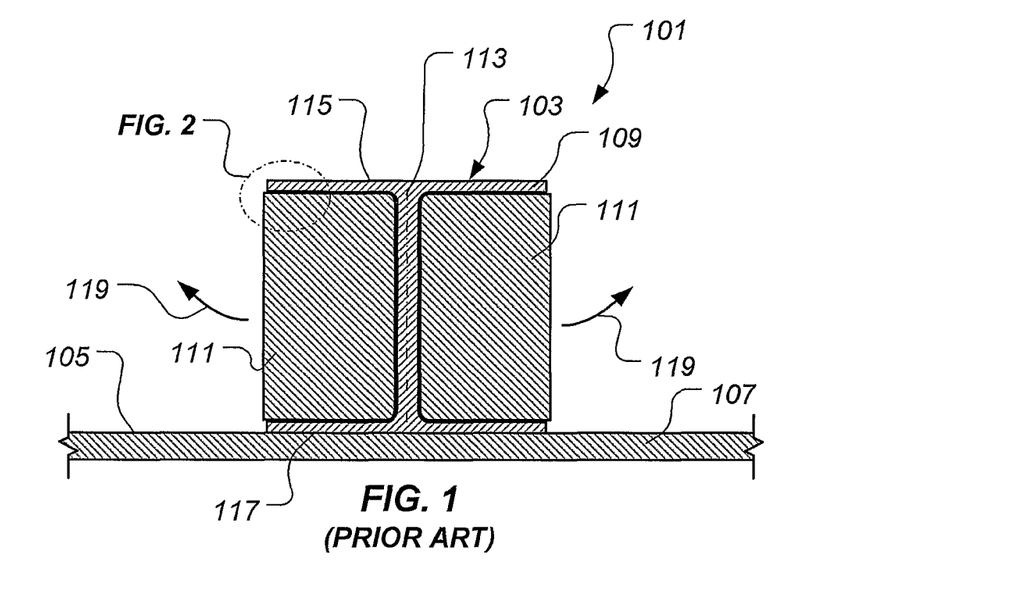
FIG. 1 is a cross-sectional view of a composite, structural component known to the art.

Structural components of modern aircraft are often constructed of composite materials. These materials typically include a fabric, mat, or other plurality of fibers disposed in a rigid, polymeric matrix. As shown in FIG. 1, such a structural component 101 includes one or more stiffeners or stringers 103 adhesively bonded to an inner surface or "inner mold line" 105 of a skin 107. Stringers 103 provide stiffness and strength to structural component 101 even with a relatively thin skin 107.

In the particular example of FIG. 1, stringer 103 is often referred to as a "T" or "I" stringer, relating to the cross-sectional shape of stringer 103. Stringer 103 is typically fabricated by applying "C" shaped portions 109 of uncured composite material around each of two mandrels 111, and then abutting the two portions of composite material, generally at 113. Radius filler material is typically applied to voids between upper and lower radii of the abutted portions of composite material. One or more additional layers of uncured composite material are often applied to a top 115 and bottom 117 of stringer 103, across interface 113 between the two portions of abutted composite material. Uncured stringer 103 is then heated, under pressure in an autoclave, under vacuum in a vacuum bag, or both, to cure the polymeric matrix and form a rigid, cured stringer 103. Stringer 103 may be cured concurrently with skin 107 or separately from skin 107.

Figure 2:
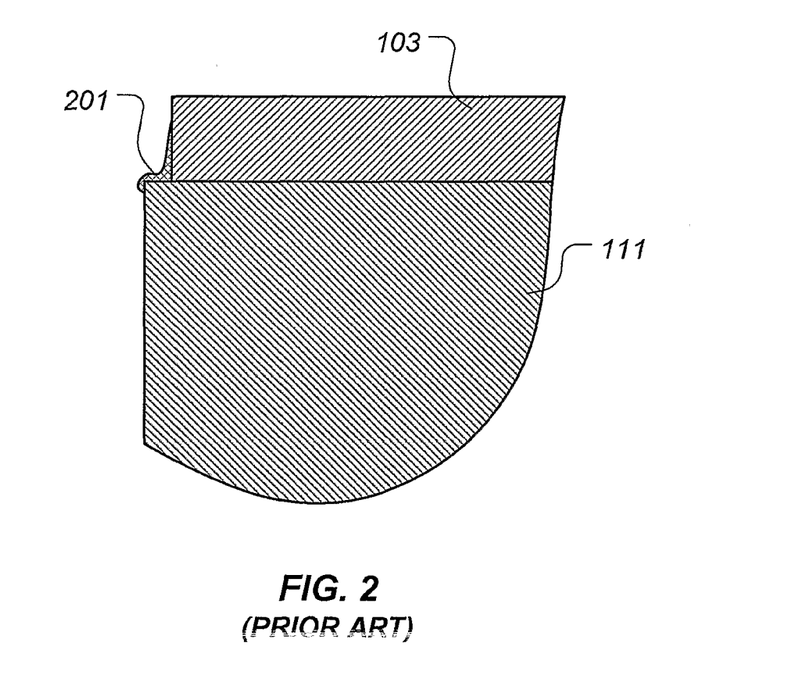
FIG. 2 is an enlarged, cross-sectional view of a portion of the composite, structural component of FIG. 1.

Typically, the polymeric matrix of the composite material comprising stringer 103 will become less viscous and will flow during the curing process. As illustrated in FIG. 2, it is common for some of the polymeric matrix to escape from stringer 103 and flow onto mandrel 111, forming a flash 201. The polymeric matrix becomes rigid during the curing process, either via cross-linking of thermosetting polymeric molecules or upon cooling of stringer 103, if the polymeric matrix comprising stringer 103 is a thermoplastic polymeric material. In either case, flash 201 can mechanically block removal of mandrels 111 from stringer 103.

Many procedures have been developed to address the problem of mandrel 111 removal. For example, a grinding or abrading process may be used to remove flash 201, thus allowing mandrel 111 to be removed from stringer 103. Such grinding or abrading processes, however, may inadvertently damage mandrel 111 and/or stringer 103, requiring repair to the damaged mandrel 111 and/or stringer 103. Wedges have been used to pry stringer 103 away from mandrel 111 and, thus, break flash 201. The forces applied to stringer 103 by such wedging processes, however, may inadvertently break the polymeric matrix and/or the reinforcing fibers of stringer 103, compromising the structural integrity of stringer 103.

Moreover, tools have been developed to mechanically urge mandrels 111 from stringer 103. These tools, however, rotate mandrels 111 from stringer 103, as indicated by arrows 119 in FIG. 1. By rotating mandrel 111 during extraction, forces applied to stringer 103 may inadvertently break the polymeric matrix and/or the reinforcing fibers of stringer 103, thus compromising the structural integrity of stringer 103.

While many procedures are known in the art for removing mandrels from cured composite structures, considerable room for improvement remains.

SUMMARY OF THE INVENTION

There is a need for a mandrel extraction tool adapted to extract a mandrel from a portion of a composite structural component, such a stringer or stiffener, without applying potentially damaging forces to the composite structural component.

In one aspect of the present invention, a mandrel extraction tool is provided. The mandrel extraction tool includes an actuator assembly and a first mandrel interface arm operably associated with the actuator assembly and adapted to engage a first mandrel. The mandrel extraction tool further includes a second mandrel interface arm operably associated with the actuator assembly and adapted to engage a second mandrel, the second mandrel interface arm being slidingly coupled with the first mandrel interface arm, such that the first mandrel interface arm moves generally linearly with respect to second interface arm when the actuator assembly is actuated.

In another aspect, the present invention provides a mandrel extraction tool. The mandrel extraction tool includes an actuator assembly and an extraction assembly operably associated with the actuator assembly, the extraction assembly adapted to generally linearly extract a mandrel from a structure.

In yet another aspect of the present invention, a method for extracting a mandrel is provided. The method includes providing a mandrel extraction tool, engaging the mandrel extraction tool with a mandrel, and applying a force to the mandrel to linearly extract the mandrel from a first portion of a structure.

The present invention provides significant advantages, including: (1) restricting the force used to extract a mandrel from a stringer or other such stiffener; and (2) extracting the mandrels individually and generally straight from the stringer or other such stiffener to prevent damage to the stringer or other such stiffener due to bending loads.

Additional objectives, features and advantages will be apparent in the written description which follows.

DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The present invention represents a tool adapted to extract a mandrel from a portion of a composite structural component, such a stringer or stiffener, without applying potentially damaging forces to the composite structural component. Specifically, the mandrel extraction tool of the present invention draws the mandrel from the stringer or stiffener without rotating the mandrel. Moreover, the mandrel extraction tool of the present invention is adapted to limit the amount of force applied to extract the mandrel from the stringer or stiffener. For example, in one embodiment, the mandrel extraction tool can be adjusted to a specific torque setting. The present invention further represents a method for using the mandrel extraction tool.

Figure 3:
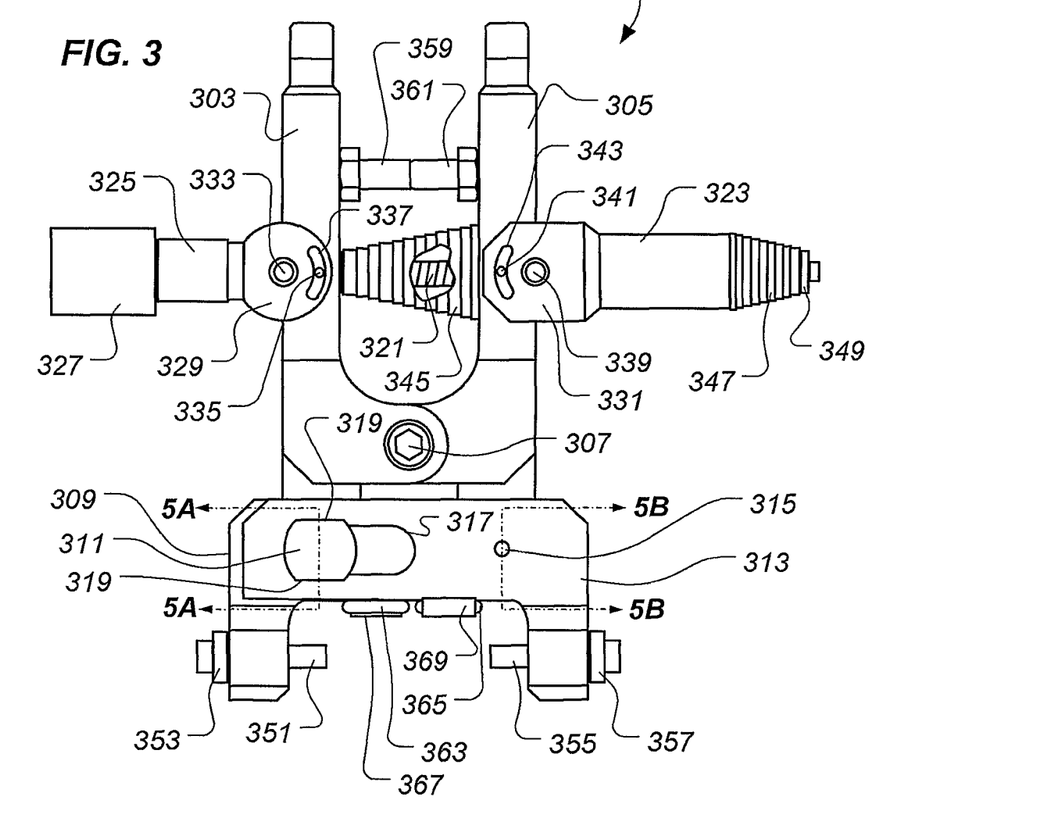
FIG. 3 is a side, elevational view of an illustrative embodiment of a mandrel extraction tool according to the present invention.
Figure 4:
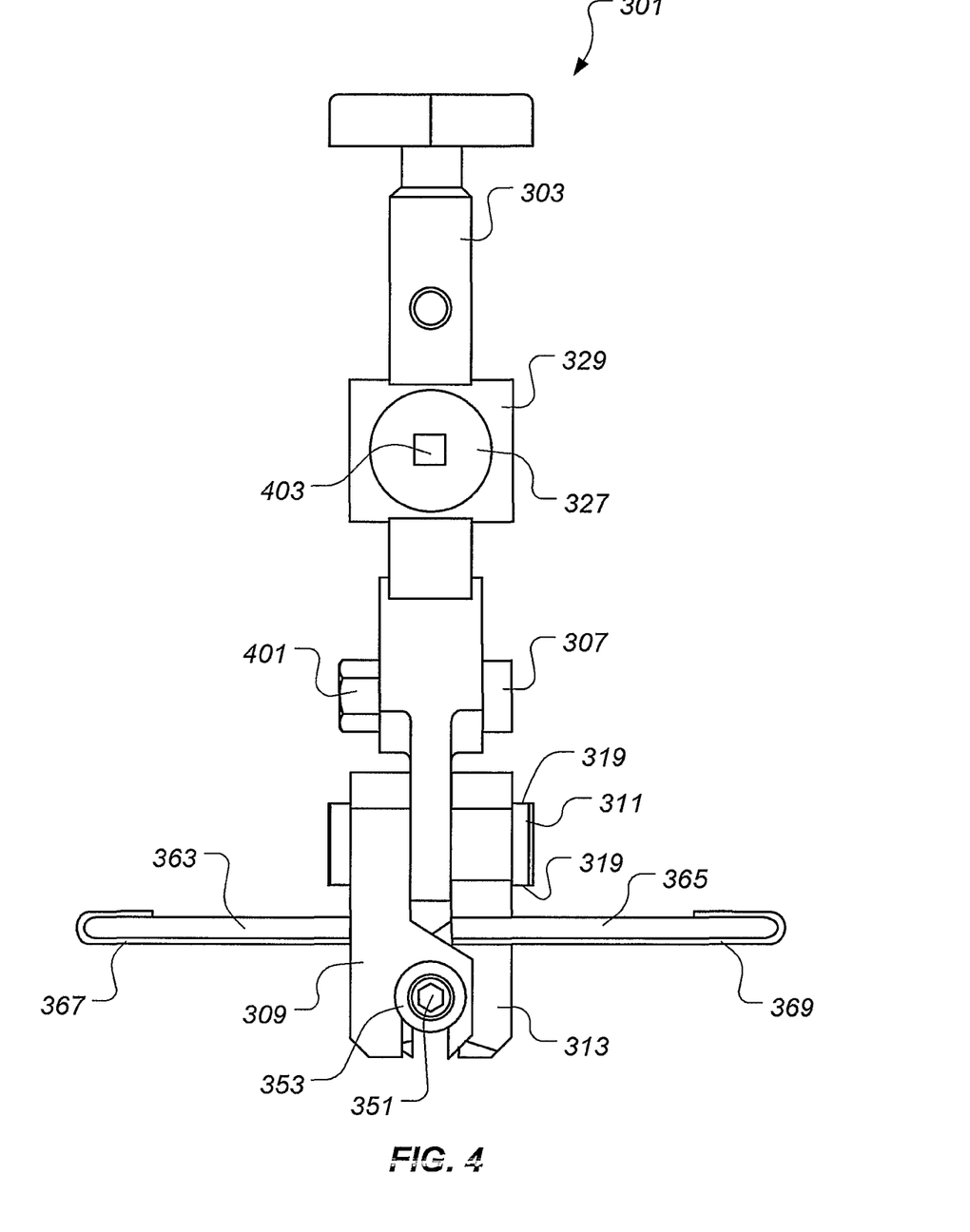
FIG. 4 is an end, elevational view of the mandrel extraction tool of FIG. 3.

FIGS. 3 and 4 depict an illustrative embodiment of a mandrel extraction tool 301 according to the present invention. Mandrel extraction tool 301 includes a first handle 303 and a second handle 305 pivotably joined by a pin 307 in a double clevis configuration. Note that in the illustrated embodiment, pin 307 is a shoulder screw. A nut 401 retains the shoulder screw in place. First handle 303 is pivotably joined to a first mandrel interface arm 309 via a pin 311. Second handle 305 is pivotably joined to a second mandrel interface arm 313 via a pin 315. As illustrated in FIG. 3, second mandrel interface arm 313 defines a slot 317 through which pin 311 extends. First mandrel interface arm 309 defines a slot 501 (shown in FIG. 5B) similar to that of slot 317 through which pin 315 extends. Generally, the disclosed configuration allows mandrel interface arms 309, 313 to move generally linearly with respect to one another when first handle 303 is pivoted relative to second handle 305 at pin 307.

Figure 5A:
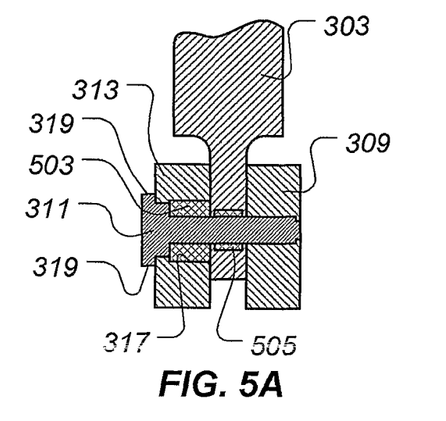
FIG. 5A is a cross-sectional view of a portion of the mandrel extraction tool of FIG. 3 taken along the line 5A-5A in FIG. 3.
Figure 5B:
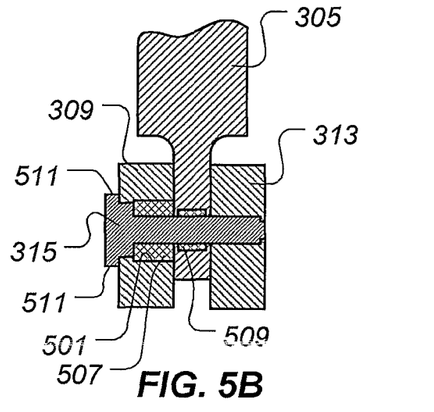
FIG. 5B is a cross-sectional view of a portion of the mandrel extraction tool of FIG. 3 taken along the line 5B-5B in FIG. 3.

FIGS. 5A and 5B illustrate one particular configuration of the interface between handles 303, 305 and mandrel interface arms 309, 313. Referring in particular to FIG. 5A, a bushing 503 is disposed between pin 311 and second mandrel interface arm 313 within slot 317. Bushing 503 allows pin 311 to slide freely along slot 317 when first handle 303 is pivoted relative to second handle 305 at pin 307 (shown in FIG. 3). A bushing 505 is disposed in first handle 303 and defines an opening through which pin 311 extends. Bushing 505 allows first handle 303 to rotate freely with respect to pin 311 when first handle is pivoted relative to second handle 305 at pin 307. Pin 311 is threadedly engaged with first mandrel interface arm 309 and can be tightened or loosened by applying a wrench or similar tool to flats 319 of pin 311.

Referring now to FIG. 5B, second handle 305 is coupled with mandrel interface arms 309, 313 in a similar fashion to the interface between first handle 303 and mandrel interface arms 309, 313 discussed above in relation to FIG. 5A. Specifically, a bushing 507 is disposed between pin 315 and first mandrel interface arm 309 within slot 501. Bushing 507 allows pin 315 to slide freely along slot 501 when first handle 303 is pivoted relative to second handle 305 at pin 307 (shown in FIG. 3). A bushing 509 is disposed in second handle 305 and defines an opening through which pin 315 extends. Bushing 509 allows second handle 305 to rotate freely with respect to pin 315 when first handle 303 is pivoted relative to second handle 305 at pin 307. Pin 315 is threadedly engaged with second mandrel interface arm 313 and can be tightened or loosened by applying a wrench or similar tool to flats 511 of pin 315.

Referring again to FIGS. 3 and 4, a drive screw 321 extends through handles 303, 305 and is engaged with a nut 323 and is retained by a coupling 325. In one embodiment, drive screw 321 comprises a ball screw and nut 323 is a ball nut engaged with the ball screw. A torque limiting device 327, such as a clutch, is coupled with coupling 325 and is adapted for engagement with a wrench or similar tool. In the illustrated embodiment, torque limiting device 327 defines a socket 403 into which a drive member of a ratchet wrench (not shown) may be inserted. Thus, when torque limiting device 327 is rotated, drive screw 321 is correspondingly rotated via coupling 325 so long as the torque applied to torque limiting device 327 falls below a predetermined level. In one embodiment, torque limiting device 327 is adjustable to different torque limiting values. In the illustrated embodiment, drive screw 321 is adapted to be driven by a wrench or the like via torque limiting device 327. Drive screw 321, however, may be adapted to be directly driven by a wrench or the like.

Coupling 325 is attached to first handle 303 via a first fitting 329 and nut 323 is attached to second handle 305 via a second fitting 331. Generally, when drive screw 321 is rotated, handles 303, 305 pivot relative to one another at pin 307. As more clearly shown in FIGS. 6A and 6B, the angular relationship between handles 303, 305 and fittings 329, 331 change as handles 303, 305 are pivoted relative to one another at pin 307. Accordingly, first fitting 329 is attached to first handle 303 via a pivot pin 333 and a guide pin 335. Guide pin 335 is fixedly mounted to first handle 303 and is disposed in a guide slot 337 defined by first fitting 329. Thus, when first fitting 329 pivots relative to first handle 303 at pivot pin 333, guide pin 335 travels within guide slot 337. Similarly, second fitting 331 is attached to second handle 305 via a pivot pin 339 and a guide pin 341. Guide pin 341 is fixedly mounted to second handle 305 and is disposed in a guide slot 343 defined by second fitting 305. Thus, when second fitting 331 pivots relative to second handle 305 at pivot pin 339, guide pin 341 travels within guide slot 343.

It should be noted that, in the illustrated embodiment, handles 303, 305; pin 307, drive screw 321, nut 323, coupling 325, fittings 329, 331; pivot pins 333, 339; and guide pins 335, 341 form an actuator assembly. Mandrel interface arms 309, 313 are operably associated with the actuator assembly, such that first mandrel interface arm 309 moves generally linearly with respect to second mandrel interface arm 313 when the actuator assembly is actuated. It should also be noted that other actuator assemblies can be used to actuate or move mandrel interface arms 309, 313. Such other actuator assemblies are encompassed within the scope of the present invention.

Referring in particular to FIG. 3, spiral or bellows covers 345, 347 are disposed around drive screw 321 to protect drive screw 321 from dirt and debris. Cover 345 is attached at one end to first handle 303 and at another end to second handle 305. Cover 347 is attached at one end to nut 323 and at another end to a rotational fitting 349 rotationally attached to drive screw 321. As drive screw 321 is rotated to pivot handles 303, 305 away from one another, cover 345 is extended or lengthened, while cover 347 is retracted or shortened. Conversely, as drive screw 321 is rotated to pivot handles 303, 305 toward one another, cover 345 is retracted or shortened, while cover 347 is extended or lengthened.

A first mandrel fastener 351 extends through a spherical washer 353, which is mounted to first mandrel interface arm 309. A second mandrel fastener 355 extends through a spherical washer 357, which is mounted to second mandrel interface arm 313. Mandrel fasteners 351, 355 are adapted to be threadedly engaged with the mandrels to be extracted, as will be more fully discussed below. Spherical washers 353, 357 provide angular compliance when threadedly engaging mandrel fasteners 351, 355 with the mandrels. In the illustrated embodiment, mandrel interface arms 309, 313 are adapted to engage mandrels through mandrel fastener 351, 355, respectively. It should be noted, however, that the scope of the present invention includes other ways of adapting mandrel interface arms 309, 313 to engage mandrels.

Also, note that, in the illustrated embodiment, first mandrel interface arm 309; second mandrel interface arm 313; pins 311, 315; and mandrel fasteners 351, 355 form an extraction assembly. The actuator assembly, discussed above, is operably associated with the extraction assembly such that, when actuated, the actuator assembly operates the extraction assembly to generally linearly extract a mandrel from a stringer. It should be noted that other extraction assemblies can be used to extract a mandrel from a stringer and are encompassed within the scope of the present invention.

Stops 359, 361 extend from handles 303, 305, respectively, such that stop 359 contacts stop 361 when mandrel interface arms 309, 313 are fully extended. Stops 359, 361 provide an indication to the user of mandrel extraction tool 301 of the progress of extraction during the extraction process. Moreover, stops 359, 361 provide a mechanical restriction, preventing mandrel interface arms 309, 313 from being overextended.

In the illustrated embodiment, mandrel extraction tool 301 further includes a first support plate 363 extending from first mandrel interface arm 309 and a second support plate 365 extending from second mandrel interface arm 313. Support plates 363, 365 rest on a top surface of a stringer or stiffener from which a mandrel is being extracted, as will be discussed in greater detail below. In one embodiment, protective layers 367, 369 are disposed on structure interface surfaces of support plates 363, 365, respectively, to protect the stringer or stiffener from inadvertent damage from support plates 363, 365 and to aid support plates 363, 365 in sliding across the stringer or stiffener as mandrel extraction tool 301 is being used.

Figure 7A:
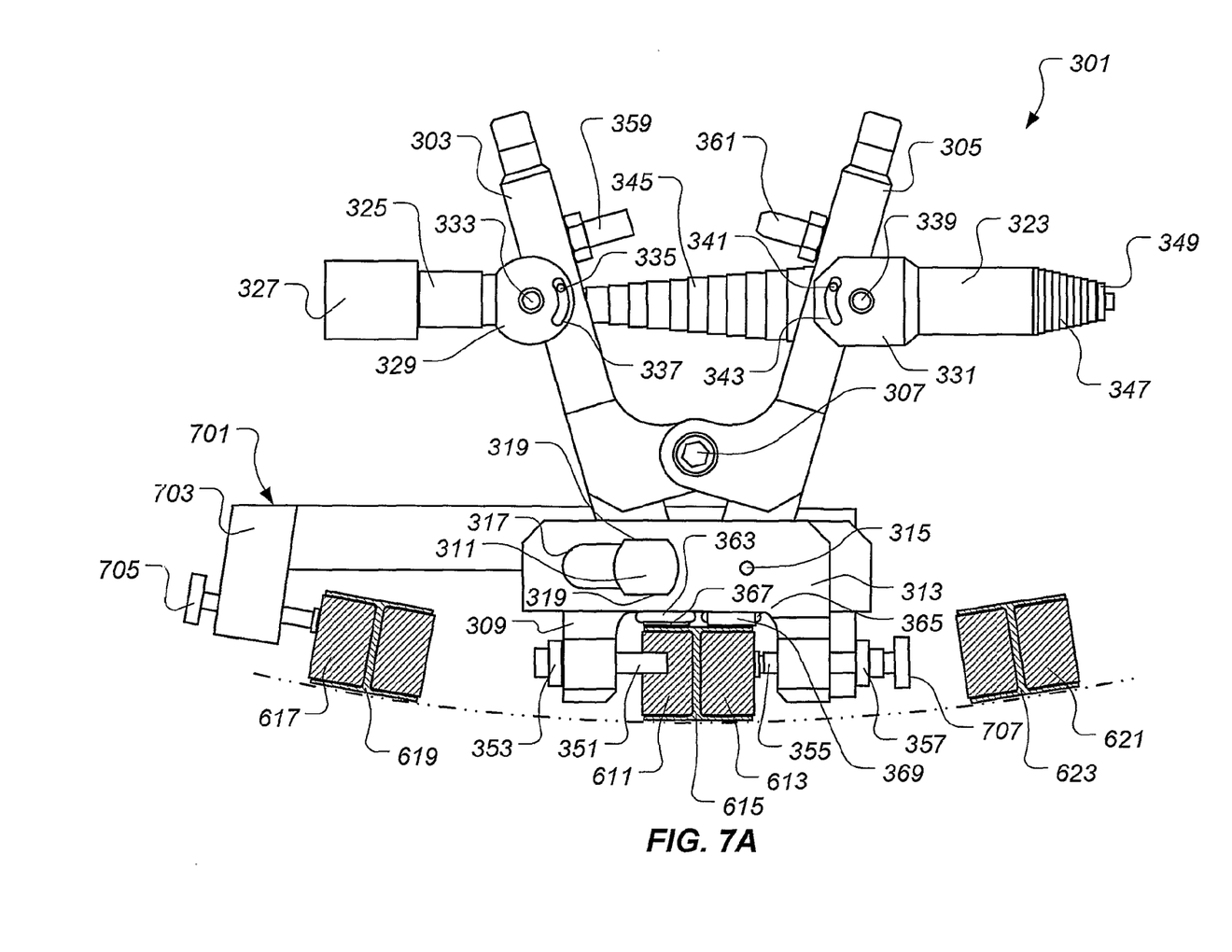
FIG. 7A is a side, elevational view of the mandrel extraction tool of FIG. 3, including an optional clamp, shown in use with a composite structural component prior to mandrel extraction.
Figure 7B:
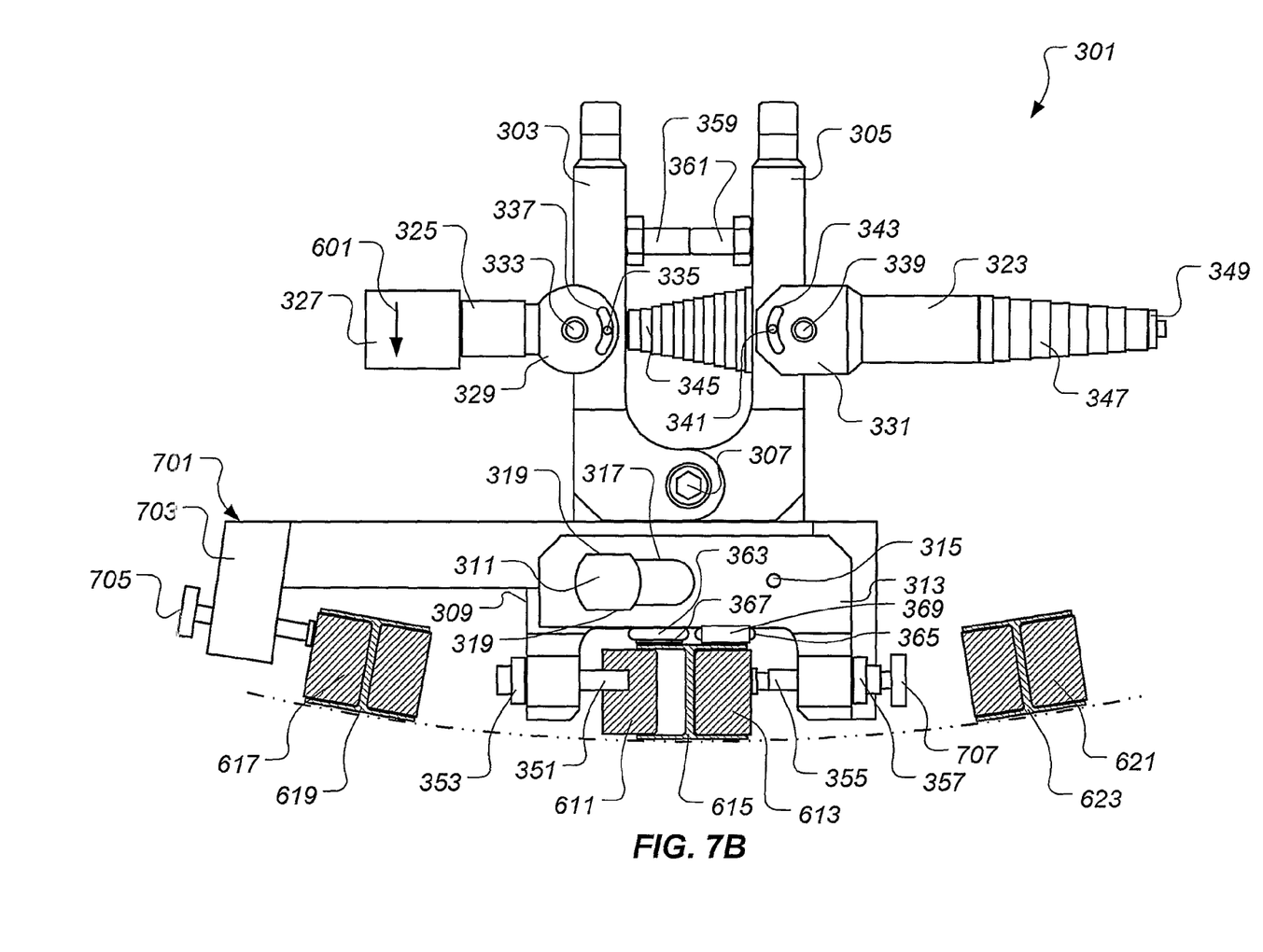
FIG. 7B is a side, elevational view of the mandrel extraction tool of FIG. 3, including the optional clamp of FIG. 7A, shown in use with a composite structural component after mandrel extraction.

It may be desirable in some implementations to provide mandrel extraction tool 301 with additional clamping means to facilitate extraction of some mandrels. Accordingly, as shown in FIGS. 7A and 7B, one embodiment of mandrel extraction tool 301 includes a clamp 701 comprising a bar 703 and thumbscrews 705, 707 disposed through bar 703.

It should be noted that some embodiments of mandrel extraction tool may omit various elements illustrated in FIGS. 3, 4, 5A, 5B, 6A, 6B, 7A, and 7B. For example, the scope of the present invention encompasses embodiments wherein torque limiting device 327; spiral covers 345, 347; rotational fitting 349; spherical washers 353, 357; stops 359, 361; support plates 363, 365; protective layers 367, 369; bushings 503, 505, 507, 509; and/or clamp 701 are omitted.

FIGS. 6A, 6B, 7A, and 7B depict various particular methods of using mandrel extraction tool 301 to extract mandrels 611, 613 from a stringer 615. Note that while mandrel extraction tool 301 is described herein as being used to remove one or more mandrels from stringers of composite structural components, the present invention is not so limited. Rather, mandrel extraction tool 301, in its various configurations, may be used to extract mandrels from any component formed by mandrels.

Figure 6A:
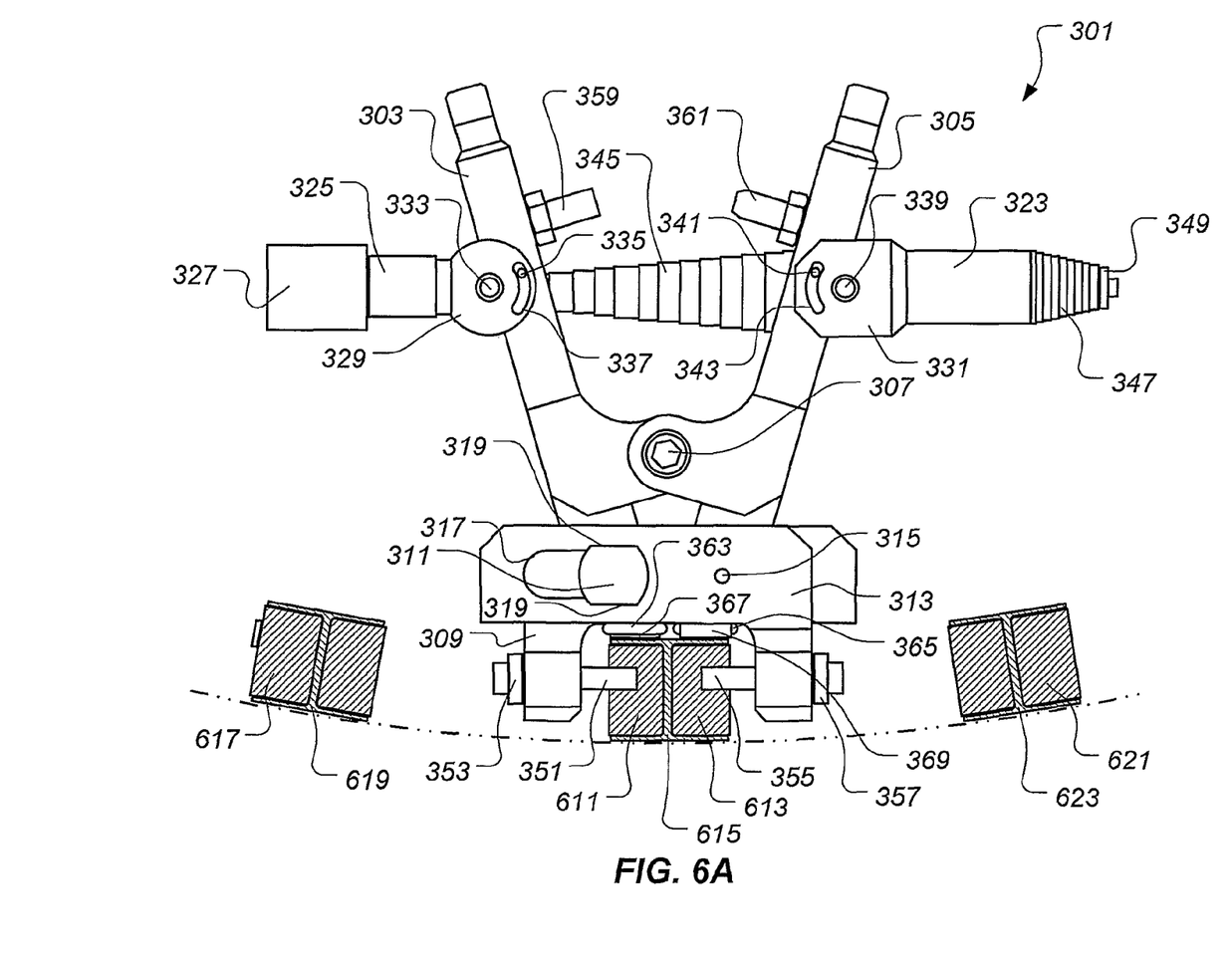
FIG. 6A is a side, elevational view of the mandrel extraction tool of FIG. 3, shown in use with a composite structural component prior to mandrel extraction.

FIG. 6A depicts mandrel extraction tool 301 in the fully retracted position. In other words, mandrel fasteners 351, 355 are at their closest position relative to one another. While in this position, one or both mandrel fasteners 351, 355 are threadedly engaged with corresponding threaded openings defined by mandrels 611, 613. Mandrel fasteners 351, 355 are advanced into mandrels 611, 613 until snug.

Figure 6B:
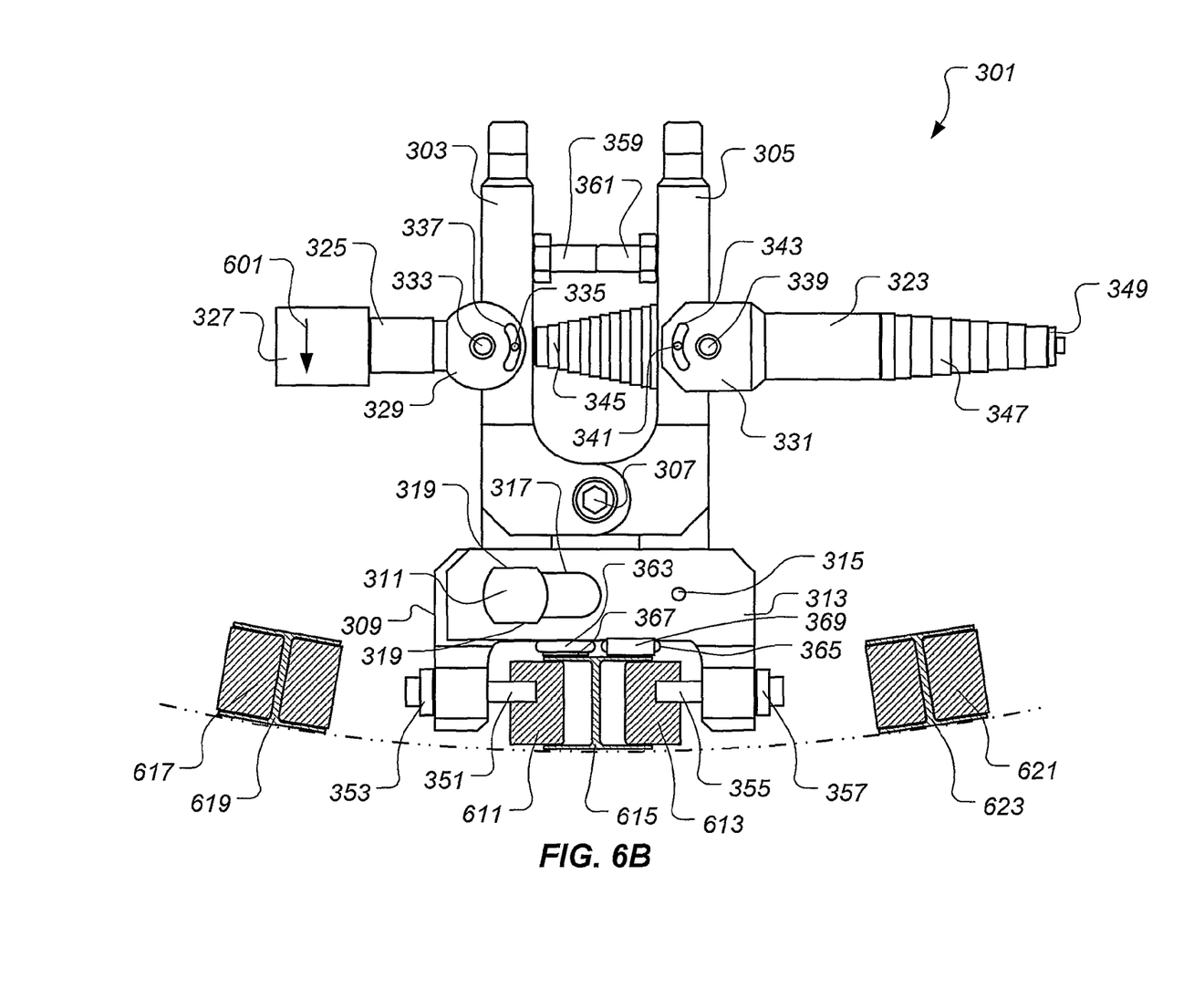
FIG. 6B is a side, elevational view of the mandrel extraction tool of FIG. 3, shown in use with a composite structural component after mandrel extraction.

In the particular use of mandrel extraction tool 301 illustrated in FIGS. 6A and 6B, both mandrels 611, 613 are being extracted simultaneously from stringer 615. As shown in FIG. 6B, torque limiting device 327 is rotated, such as indicated by an arrow 601, with a wrench or other suitable tool engaged with torque limiting device 327. As drive screw 321 (shown in FIG. 3) is coupled with torque limiting device 327 via coupling 325, drive screw 321 is rotated as torque limiting device 327 is rotated. Rotating drive screw 321 moves nut 323 along drive screw 321, thus pivoting handles 303, 305 toward one another. As described above, as handles 303, 305 are moved closer by pivoting at pin 307, mandrel interface arms 309, 313 are extended, moving mandrel fasteners 351, 355 further apart. As mandrel fasteners 351, 355 are moved further apart, mandrels 611, 613 are extracted at least partially from stringer 615. Torque limiting device 327 is rotated until stops 359, 361 meet, indicating full operation of mandrel extraction tool 301. Note that if torque limiting device 327 is further rotated after stops 359, 361 meet, torque limiting device 327 prevents further rotation of drive screw 321.

It should be noted that torque limiting device 327 is set such that a force sufficient to damage stringer 615 cannot be imparted to stringer 615. As noted above, in one embodiment, torque limiting device 327 is adjustable to various torque limits, according to the configuration and strength of the composite structure from which one or more mandrels are being extracted.

As illustrated in FIGS. 7A and 7B, mandrel extraction tool 301 may include clamp 601 so that only one mandrel, such as mandrels 611, 613, can be extracted. Clamp 601 may also be used to provide additional stability to mandrel extraction tool 301. In one particular use, shown in FIG. 7A, thumbscrew 605 of clamp 601 is abutted to a mandrel 617 in a stringer 619 and thumbscrew of clamp 601 is abutted to mandrel 613 in stringer 615. Mandrel extraction tool 301 is, then, actuated, as shown in FIG. 7B, to extract mandrel 611 from stringer 615. In the same way, mandrel extraction tool 301 may alternatively be used to extract mandrel 611 from stringer 615 by abutting thumbscrew 605 to a mandrel 621 in a stringer 623. The use of clamp 601, however, is optional, as mandrels 611, 613 may be extracted simultaneously as described above without the use of clamp 601, as discussed above concerning FIGS. 6A and 6B.

Figure 8:
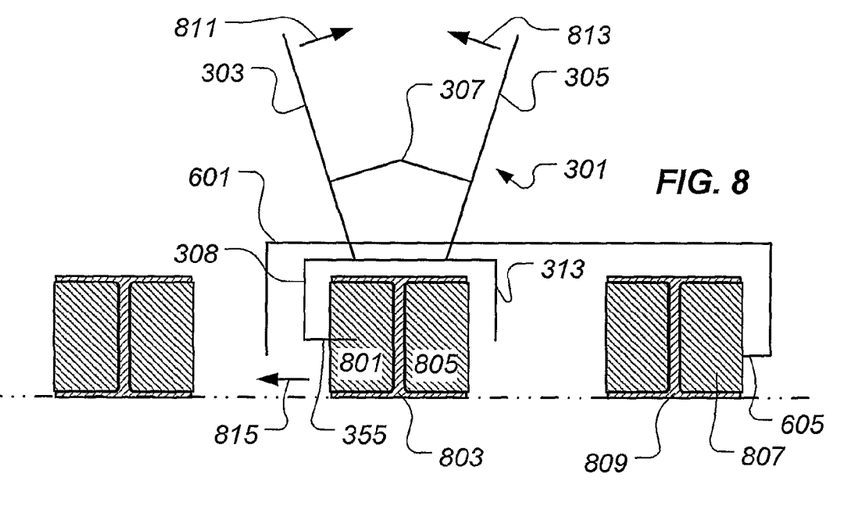
FIGS. 8 and 9 are stylized, schematic views illustrating various exemplary extraction methods according to the present invention.
Figure 9:
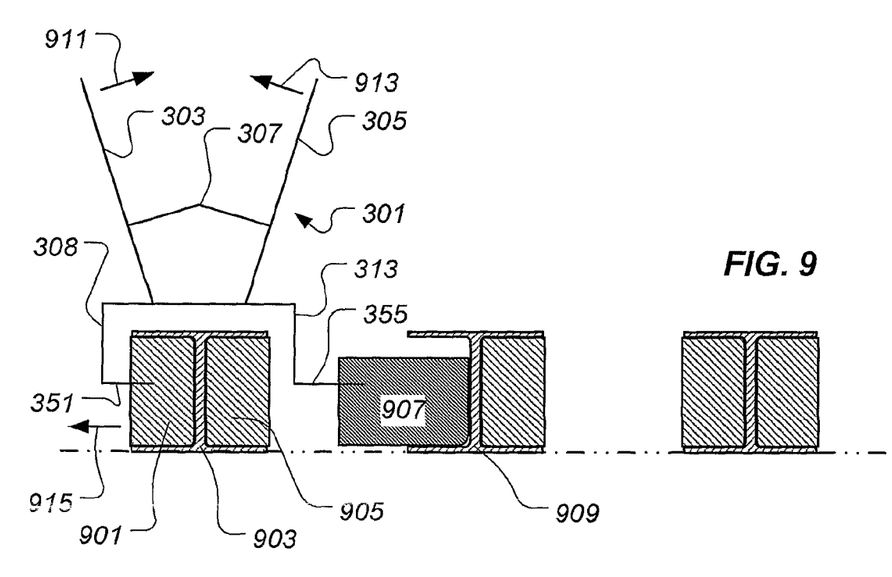

Mandrel extraction tool 301 may be used in various configurations and ways to extract mandrels from composite structures. As discussed above regarding FIGS. 6 and 7, mandrel extraction tool 301 may be used to extract two mandrels simultaneously, with or without clamp 601. FIGS. 8 and 9 illustrate two additional exemplary configurations of mandrel extraction tool 301 used to remove a mandrel from a composite structure. It should be noted that, in FIGS. 8 and 9, mandrel extraction tool 301 is depicted in a stylized, schematic form to more clearly describe the use of mandrel extraction tool 301.

The configuration of mandrel extraction tool 301 shown in FIG. 8 may be used to extract a mandrel 801 from a stringer 803. Note that a mandrel 805 may or may not be present in stringer 803. In this implementation, second mandrel fastener 355 is engaged with mandrel 801. First mandrel fastener 351 is not utilized in extracting mandrel 801 and, thus, is not shown in FIG. 8. Thumbscrew 605 of clamp 601 abuts a mandrel 807, disposed in an adjacent stringer 809, to counteract the force applied to mandrel 801 during extraction. To extract mandrel 801, handles 303, 305 are moved toward one another, as indicated by arrows 811, 813, by the interaction between drive screw 321 (shown in FIG. 3) and nut 323 (shown in FIGS. 3, 6A, 6B, 7A, and 7B), resulting in handles 303, 305 being pivoted relative to one another at pin 307. Second mandrel interface arm 313 is, thus, moved generally in a direction indicated by an arrow 815 to extract mandrel 801.

In the exemplary implementation depicted in FIG. 9, mandrel extraction tool 301 is used to extract a mandrel 901 from a stringer 903. Note that mandrel 905 may or may not be present in stringer 903. In this implementation, first mandrel fastener 351 is engaged with mandrel 901. Second mandrel fastener 355 is engaged with a spacer or block 907 abutting an adjacent stringer 909 to counteract the force applied to mandrel 901 during extraction. To extract mandrel 901, handles 303, 305 are moved toward one another, as indicated by arrows 911, 913, by the interaction between drive screw 321 (shown in FIG. 3) and nut 323 (shown in FIGS. 3, 6A, 6B, 7A, and 7B), resulting in handles 303, 305 being pivoted relative to one another at pin 307. As second mandrel interface arm 313 is fixed to block 907 via second mandrel fastener 355, first mandrel interface arm 309 is moved generally in a direction indicated by an arrow 915 to extract mandrel 901. Alternatively, second mandrel fastener 355 or second mandrel interface arm 313 may abut block 907, rather than second mandrel fastener 355 being engaged with block 907. Note that the particular geometric configuration of block 907, as illustrated in FIG. 9, is merely exemplary.

It should be noted that, in any of the implementations described herein, mandrel extraction tool 301 may be reversed in position. For example, as an alternative to the exemplary implementation of FIG. 9, first mandrel fastener 351 may be engaged with block 907 and second mandrel fastener 355 may be engaged with mandrel 901. Operation of mandrel extraction tool 301 in this configuration effects the same extraction of mandrel 901 as in the configuration disclosed above concerning FIG. 9.

Figure 10:
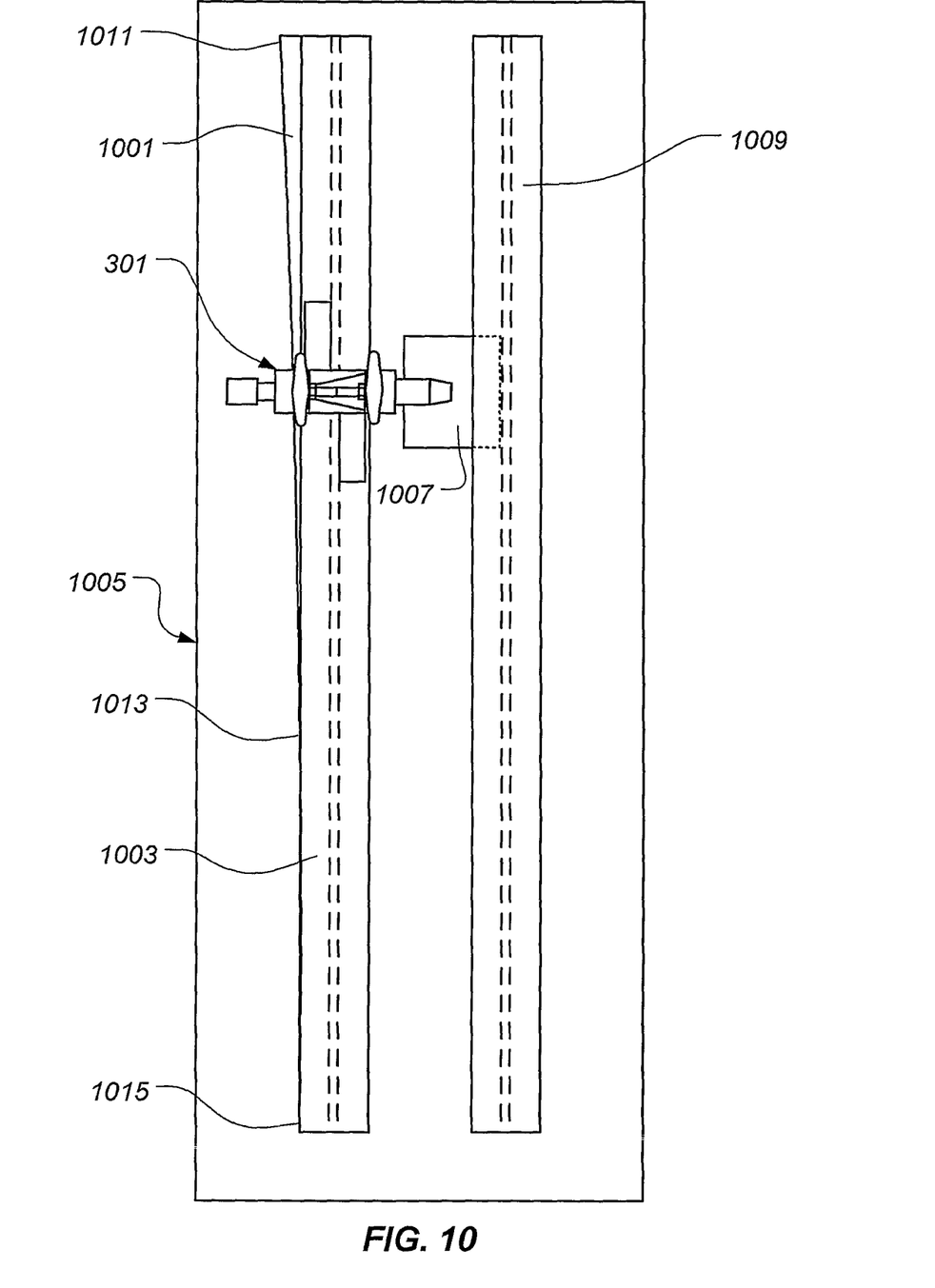
FIG. 10 is a top, plan view of an illustrative embodiment of a mandrel extraction tool according to the present invention in use to extract a mandrel from a composite structural component.

It may be necessary to operate mandrel extraction tool 301 at multiple locations along the length of a mandrel, especially if the mandrel is long. For example, as shown in FIG. 10, mandrel extraction tool 301 is used to extract a mandrel 1001 from a stringer 1003 of a composite structure 1005. In this example, first mandrel fastener 351 (best shown in FIGS. 3, 6A, 6B, 7A, and 7B) is engaged with mandrel 1001, while second mandrel fastener 355 (best shown in FIGS. 3, 6A, 6B, 7A, and 7B) is engaged or abutted block 1007. Block 1007 is abutted a stringer 1009 adjacent stringer 1003. This configuration corresponds to that illustrated in FIG. 9. In the illustrated implementation, mandrel extraction tool 301 has already been applied to mandrel 1001 generally at 1011 and has extracted mandrel 1001 from stringer 1003 at the location of mandrel extraction tool 301 in FIG. 10. Mandrel extraction tool 301 will subsequently be operated on mandrel 1001 generally at 1013 and generally at 1015 to fully extract mandrel 1001. Note that the locations 1011, 1013, 1015 are merely exemplary. It will be appreciated that mandrel extraction tool 301 is operated on mandrel 1001 at one or more locations along the length of mandrel 1001 to extract mandrel 1001 from stringer 1003.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below. It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A mandrel extraction tool, comprising:
   an actuator assembly having;
     a first pivot pin pivotably coupling a first fitting and a first handle;
     a second pivot pin pivotably coupling a second fitting and a second handle;
     a first guide pin extending from the first handle, the first guide pin extending into a slot defined by the first fitting; and
     a second guide pin extending from the first handle, the second guide pin extending into a slot defined by the second fitting;

a first mandrel interface arm operably associated with the actuator assembly and adapted to engage a first mandrel, the first mandrel interface arm being pivotal with respect to the first handle; and a second mandrel interface arm operably associated with the actuator assembly and adapted to engage a second mandrel, the second mandrel interface arm being pivotal with respect to the second handle, the second mandrel interface arm being slidingly coupled with the first mandrel interface arm, such that the first mandrel interface arm moves generally linearly with respect to the second mandrel interface arm when the actuator assembly is actuated.

2. The mandrel extraction tool according to claim 1, wherein the actuator assembly comprises:

a drive screw coupled with the first handle; and a nut threadedly coupled with the drive screw and coupled with the second handle, such that the first handle is pivoted with respect to the second handle when the drive screw is threadedly advanced through the nut.

3. The mandrel extraction tool according to claim 2, wherein the drive screw is a ball screw and the nut is a ball nut.

4. The mandrel extraction tool according to claim 2, further comprising:

a coupling for retaining the drive screw.

5. The mandrel extraction tool according to claim 2, further comprising a cover enclosing a portion of the drive screw.

6. The mandrel extraction tool according to claim 2, further comprising:

a torque limiting device attached to the drive screw.

7. The mandrel extraction tool according to claim 6, wherein the torque limiting device defines a socket for receiving a drive member of a wrench.

8. The mandrel extraction tool according to claim 2, wherein the drive screw is adapted to be driven by a wrench.

9. The mandrel extraction tool according to claim 1, further comprising:

a first pin engaged with the first mandrel interface arm, extending through the first handle, and extending into a slot defined by the second mandrel interface arm; and a second pin engaged with the second mandrel interface arm, extending through the second handle, and extending into a slot defined by the first mandrel interface arm.

10. The mandrel extraction tool according to claim 1, further comprising:

a first mandrel fastener extending from the first mandrel interface arm; and a second mandrel fastener extending from the second mandrel interface arm.

11. The mandrel extraction tool according to claim 1, further comprising:

a clamp for retaining the mandrel extraction tool on a structure.

12. The mandrel extraction tool according to claim 1, further comprising:

a stop for limiting travel of the first handle and the second handle.

13. The mandrel extraction tool according to claim 1, further comprising:

a support plate extending from one of the first mandrel interface arm and the second mandrel interface arm.

14. The mandrel extraction tool according to claim 13, further comprising:

a protective layer disposed on a structure interface surface of the support plate.

* * * * *